G. L. KAVANAGH.
TIRE.
APPLICATION FILED JULY 25, 1914.

1,266,127. Patented May 14, 1918.

Witnesses

Inventor
G. L. Kavanagh
By
His Attorneys

UNITED STATES PATENT OFFICE.

GEORGE LENNON KAVANAGH, OF MONTREAL, QUEBEC, CANADA.

TIRE.

1,266,127.　　　　Specification of Letters Patent.　　Patented May 14, 1918.

Application filed July 25, 1914. Serial No. 853,144.

*To all whom it may concern:*

Be it known that I, GEORGE LENNON KAVANAGH, a citizen of the Dominion of Canada, and resident of the city of Montreal, in the Province of Quebec and Dominion of Canada, have invented certain new and useful Improvements in Tires, of which the following is a full, clear, and exact description.

This invention relates to improvements in tires, and the object is to provide a simple and durable tire which does not depend upon compressed air for its resiliency.

A further object is to provide a tire which may be adjusted according to the load to which it is subjected.

The invention consists essentially in providing a substantially solid tire having a comparatively small opening in the approximate center thereof, so disposed and arranged that flattening of the tire under load tends to close this opening, which closing tendency is resisted by the elasticity of the materials surrounding the opening.

In the drawings which illustrate the invention:—

Figure 1:
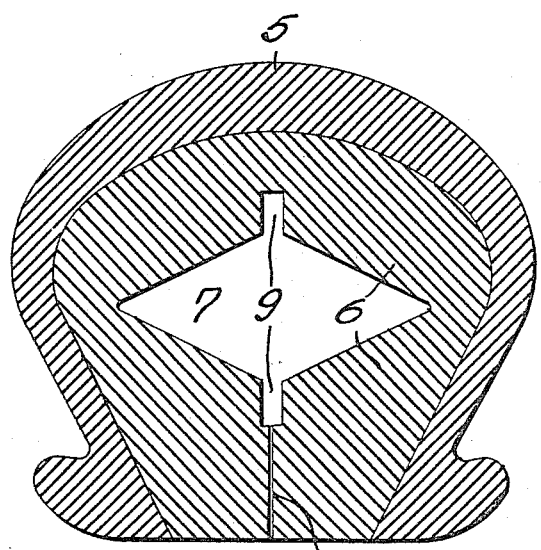
Figure 1 is a cross sectional view of the tire.
Figure 2:
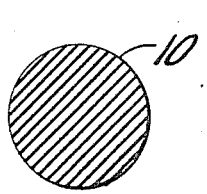
Figs. 2, 3 and 4 are cross sectional views of various forms of filler used for tires subjected to heavy loads.
Figure 3:
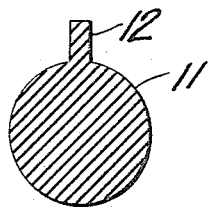

Referring more particularly to the drawings, 5 designates a casing of substantially the usual form and structure, that is to say, built up of fabric layers vulcanized in rubber. Within the casing is a filler 6 vulcanized to the casing over the entire or nearly the entire surface. This filling is of rubber or other suitable material softer and more elastic than the material used in the casing. The filler 6 is formed with an opening 7 of diamond or elliptical shape in cross section, extending entirely around the tire. This opening or channel 7 may be entered from the inner periphery of the tire by separating the walls of a slit 8 which extends from the inner periphery of the tire to the channel 7. The opening may also be provided on the outer and inner sides with grooves 9 extending into the material of the filling. The passage 7 may be left vacant in the case of a tire adapted for light loads, but if heavier loads are to be supported, a secondary filling may be inserted in the channel 7. This filling may be of rubber or the like, softer and more elastic than the filling 6, and of any of the forms shown in Figs. 2, 3 and 4. The filler 10, shown in Fig. 2, is circular in cross section, and is free to move in the channel 7 when inserted. The filler shown in Fig. 3 is circular in form, but provided with a flange 12 adapted to engage the outer groove 9 and hold the filler against lateral movement in the channel. This filler is adapted for heavier loads than the filler 10.

Figure 4:
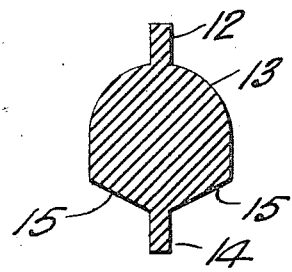

The filler 13 shown in Fig. 4 is adapted for still heavier loads, and is partially circular in form, being provided with a rib 12 similar to the filler 11, and with an additional rib 14 adapted to engage the inner groove 9. This filler 13 is provided with a flattened base 15 of increased area which rests securely against the inner wall of the channel. The fillers are inserted when desired by separating the walls of the slit 8 apart in exactly the same manner that the pneumatic tube is inserted in the ordinary casing.

The operation of the device is extremely simple. The cross section shape of the channel 7 is approximately that of a full elliptic spring, the casing and filling 6 around the channel representing the material of the spring itself. When the tire is under load, the portion thereof resting on the ground tends to flatten, thus partially closing the channel 7 in exactly the same way that an elliptic spring flattens under load. This closing tendency of the channel sets up a number of stresses in the material of the tire, which are resisted by its elastic nature. The portion of the filling outside the channel is subjected to compression and flexion combined, while the portions of the filling inside the channel are subjected to elongation and flexion. These two opposite actions tend to return the channel and tire to normal form, and thus impart the desired resiliency. In addition to this, the tread portion of the casing is subjected to the usual flattening and bending stresses, while the side portions are under tension. When the fillers shown in Figs. 2, 3 and 4 or any other form of fillers are used, they form compression members between the inner and outer walls of the channel, and tend to resist the flattening of the tire in exactly the same way as the helical cushion springs sometimes found inserted in elliptic springs. Thus, the filling 6 has the same effect as a multitude of small elliptic springs placed around the rim of a wheel with their longitudinal axes parallel with the axis of the wheel.

It is obvious that the tire is not subject to puncture, and is not nearly so liable to rim cutting and other troubles as a tire which is under heavy internal pressure. All portions of the material not actually under load are at rest instead of being under constant load, as is the case with pneumatic or other fluid filled tires, so that the life of the material is greatly increased. The filling being vulcanized or cemented in the casing forms an integral part thereof, so that no relative movement occurs between the filling and the casing, and thus much of the heating due to movement between the outer and inner tubes of the ordinary tire is prevented.

Having thus described my invention, what I claim is:—

1. A tire of the character described, comprising a casing, a filling therein having an annular passage therein substantially diamond-shaped in cross-section with grooves extending from two vertical points of the diamond, and a resilient annular filler in said passage having ribs for engagement with said grooves.

2. A tire of the character described comprising a casing, a filling therein having an annular passage therein substantially diamond shape in cross section with grooves extending from two vertical points of the diamond, and a resilient filler in said passage, said filler comprising an annular member held vertically in said passage by engagement of its inner and outer peripheries with said grooves and lateral enlargements on each side of said member whose surfaces are partly plane and partly curved.

In witness whereof, I have hereunto set my hand, in the presence of two witnesses.

GEORGE LENNON KAVANAGH.

Witnesses:
  S. R. W. ALLEN,
  G. M. MORDANT.

Copies of this patent may be obtained for five cents each, by addressing the "Commissioner of Patents, Washington, D. C."